April 11, 1950     T. JAMES, JR     2,503,489
MULTIPLE OPERATED VEHICLE BRAKE
Filed Oct. 5, 1945     2 Sheets-Sheet 1
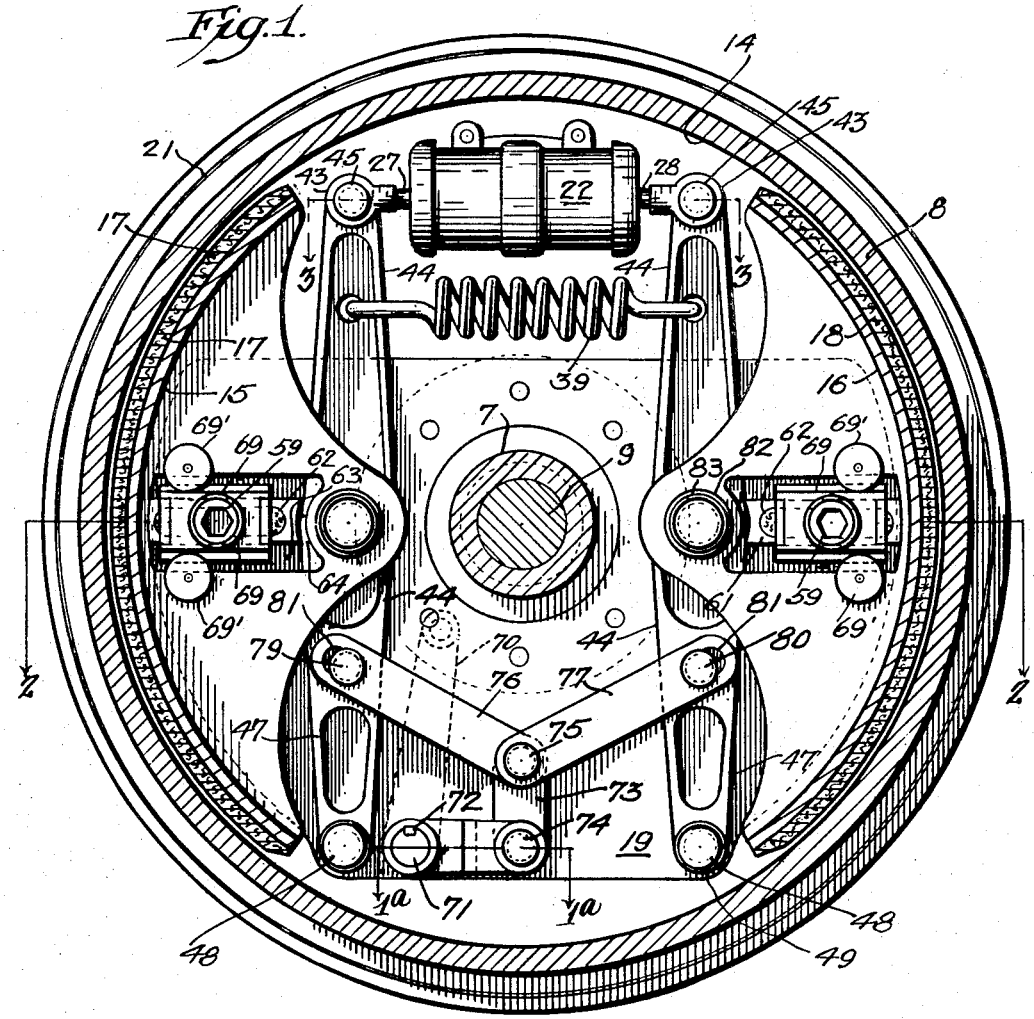
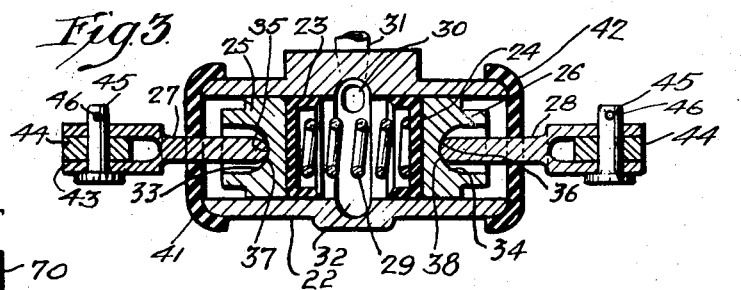
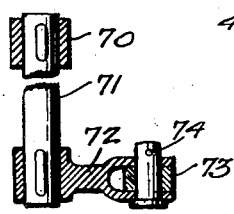
Inventor
Thomas James, Jr.
Attorneys

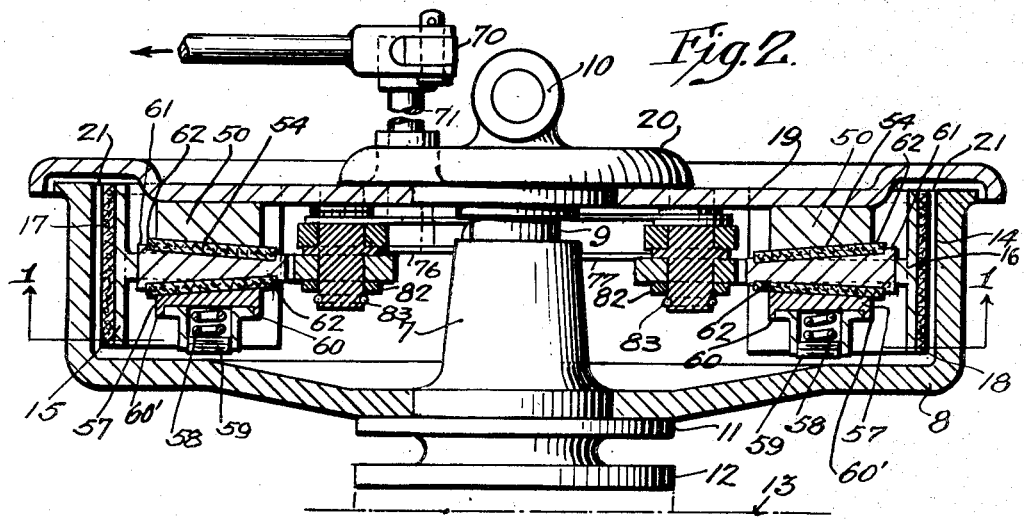
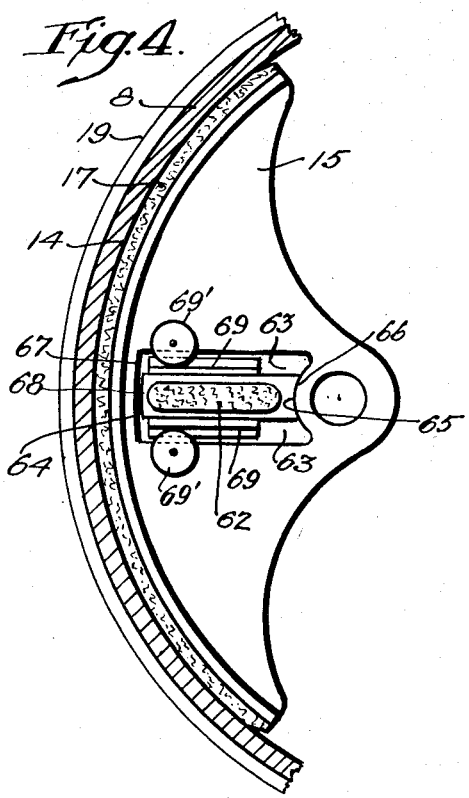
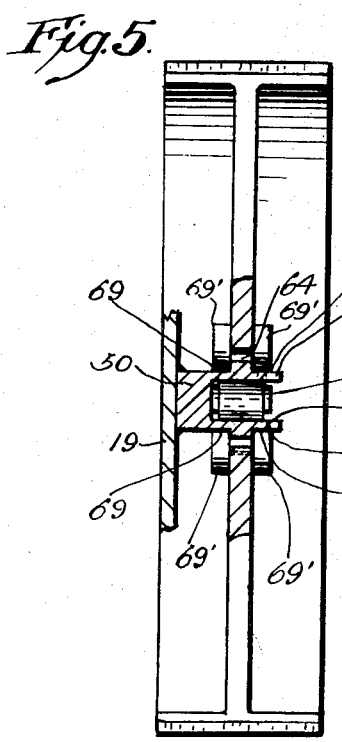

Patented Apr. 11, 1950

2,503,489

UNITED STATES PATENT OFFICE 2,503,489

MULTIPLE OPERATED VEHICLE BRAKE

Thomas James, Jr., Oaklyn, N. J.

Application October 5, 1945, Serial No. 620,537

7 Claims. (Cl. 188—106)

My invention relates to improvements in self-adjusting and balanced brakes for use upon shafts and axles. It is suited to use upon axles of railway cars and is particularly well adapted for use upon axles of automobiles and the like.

The main object of my invention is to provide a brake which is self-adjusting.

A further object is to maintain a predetermined brake piston displacement, regardless of the position of the pistons in their cylinder.

A further object is to maintain a predetermined clearance between a brake head lining and the face of the brake drum when the brake is in release position, regardless of the wear of the lining during brake application.

A further object is to ensure that both brake heads within the same brake drum will create the same amount of retarding force when the brake is applied, regardless of the direction of rotation of the brake drum.

A further object is to deliver all brake forces along the center line of the brake heads.

A further object is to support brake heads when they come in contact with a revolving brake drum regardless of the direction of rotation of said drum.

A further object is to provide a limit within which the brake heads may move between the full brake position and release position and automatically to shift this range of movement with wear of the brake surfaces, using the brake operating power to make this automatic shift and maintaining this extent of motion.

A further object is to provide friction-held adjustment plungers, capable of being moved by operation of brake heads and remaining in the positions to which they have been moved to maintain a predetermined clearance between the plungers and the brake head whereby normal operation of the brakes takes place without movement of the plungers, but the brake head operation automatically shifts the positions of the plungers when brake surface wear has taken place and to the extent to which this has taken place.

A further object is to protect against self-energization of the brake.

A further object is to adapt a power brake using a wheel cylinder, to operation independently of the wheel cylinder.

These, together with various other novel features of construction and arrangements of the parts, which will hereinafter be more fully described and claimed, constitute my invention.

I have preferred to illustrate my invention by a single form only thereof, selecting a form which is practical, effective, simple and inexpensive and which at the same time well illustrates the principles thereof.

Figure 1 is a sectional front elevation with the brake drum cut away as on line 1—1 of Figure 2, showing my novel brake mechanism in release position.

Figure 1ª is a fragmentary sectional view of the emergency brake mechanism bell crank, taken on line 1ª—1ª of Figure 1.

Figure 2 is a sectional plan view as on line 2—2 of Figure 1.

Figure 3 is a sectional plan view of the operating cylinder, the so-called wheel cylinder, taken on the line 3—3 of Figure 1, drawn on an enlarged scale as compared to that in Figure 1.

Figure 4 is a fragmentary side elevation of the brake head and brake adjuster plunger, with the brake adjuster cover removed. It shows the relative position of the brake head and the brake adjuster plunger when the brake is applied.

Figure 5 is an end view of the brake head with part of the brake lining and face of the brake head cut away and with some parts shown in cross section.

Similar numerals relate to like parts.

In the drawings, my novel brake mechanism is associated with hub 7 (Figures 1 and 2) adapted to be driven in either direction, or to be rotated by the traction wheel of a vehicle. It may be secured to a flange of the hub 7 or to a traction wheel of a vehicle.

One example of a suitable rotatable unit is seen in Figures 1 and 2. It includes a casing 8 mounted upon and rotatable with the hub 7 about the shaft 9 of the stationary steering knuckle unit 10 (Figure 2).

The casing 8, Figure 2, is permanently closed at the outer end and is welded or bolted to the flange 11 of the hub 7. The second hub flange 12 may be secured to a vehicle wheel 13, for example.

The opposite or inner end of said casing is initially open and its inner cylindrical surface 14 forms a brake drum adapted for the application of the brake heads 15—16 which are lined with friction linings 17—18, hereinafter described.

The backing plate 19, Figures 1 and 2, is bolted or welded to the flange 20 of the stationary unit 10, and will act to hold the backing plate 19 against rotation. The said plate forms a cover or closure for the brake drum opening 21.

The wheel cylinder 22, Figure 1, is of the type commonly used in connection with brake systems and is secured to the backing plate 19 by means of bolts, Figure 1. The said cylinder is provided with cylinder cups 23—24, pistons 25—26, which are of the same diameter, piston push rods 27, 28 and cylinder spring 29. The cylinder is also provided with a port 30 connected by a pipe 31 with a source of fluid pressure which communicates with pressure chamber 32, Figure 3.

The outer ends of the pistons 25—26 carry radial seats 33—34, which receive the inner ends 35—36 of the cylinder push rods 27—28. The rods have radial ends 37—38 forming universal bearings with the seats and are held in contact with the seats by retraction spring 39 when the pressure in the chamber 32 is reduced and the brakes are in release position.

Spring 29 holds the cylinder cups 23—24 in contact with pistons 25—26 when the brakes are in release position, Figure 3.

The cylinder 22 is closed by rubber dust covers 41, 42 to protect the inside of the cylinder against entrance of foreign matter.

The outer ends of the piston push rods are yoked at 43 and through the yokes are pivotally connected to the tops of the brake levers 44 by push rod pins 45, which in turn are retained by cotter pins 46, Figure 3.

The bottom ends 47 of the brake levers are pivotally mounted upon a fixed member such as backing plate 19, by brake lever anchor pins 48 and are held in place upon the pins by the anchor pin retaining rings 49, Figure 1.

The inner ends of the brake lever anchor pins 48 are secured to the backing plate in any suitable manner.

During the greater part of their operation, the brake adjusters act as stops, setting limits to the movement of the brake heads in release position.

The brake adjusters comprise stationary housings 50, welded to the backing plate 19, presenting spaced walls 51, 52 about spaces 53, Figures 2 and 5. The spaces are rectangular in cross section and their longitudinal axes are parallel with the lengths of the housings.

In radial sections, parallel to the paper (see Figure 2) the housing walls are tapered, one face of each comprising the tapered face of a block 54, rigid with the backing plate. The opposite faces are the faces of gibs or pressure plates 57 which slide toward and away from the plungers within side walls 51, 52 of the housings. The pressure plates are spring pressed toward the plungers by springs 58.

The pressure of the springs against the plates is adjustable by screwing in or out plugs 59. The pressure of the plates toward the plungers is thus fully within control and can be adjusted with great nicety.

Flanges 60 and 60' prevent accidental removal of the pressure plates from the housings.

Between the tapered walls of the housings are located wedge adjuster plungers 61 having friction inserts 62 within those wedge faces which would otherwise engage the surfaces of plates 57.

The wedge adjusting plungers lie within openings 63 in the brake heads so that the wedge adjusters stop radial movements of the brake heads inwardly. Play is provided as at 64 to permit sufficient movement in any set adjusted positions of the two adjusters to permit outward movement of the heads for braking purposes and inward movement of the heads to release the brakes.

As illustrated the outwardly facing inner limiting surfaces 65 of the openings, during the movements of the brake heads, outwardly engage with the inwardly facing inner ends 66 of the plungers. In normal operation this outward movement of the heads is sufficient to set the brakes; but if the brake linings be worn, the pressure of the linings against the interior of the drum will be reduced as compared with braking pressure so that the outward movement of the brake heads will result in partial outward movement of the normally fixed adjuster plungers. This results in a new "setting" of the plungers and normal operation with the new plunger setting again takes place.

The plungers are tapered so as to be capable of being pushed outwardly in this manner without danger of being pushed inwardly again when the brakes are released by reason of the action of the retractive spring, causing the inwardly facing walls 67 of the brake head openings to engage the outwardly facing outer ends 68 of the plungers.

The friction material inset within the plungers prevents the plungers from moving easily and also prevents them from moving back after they have been pushed out by the brake heads.

Of course, when a new lining is inserted in either of the brake constructions the brake adjuster unit must be reset to correspond with the new thickness of lining material between the brake head flanges and the interior surfaces of the drum. It is desirable but not necessary that both of the brake heads shall be relined when it becomes necessary to reline one of them.

In order to prevent self-energization of the brake, I use stops between the brake heads and the housings, locating these stops as close as may be to the outer flanges of the heads and by them definitely preventing the brake head surfaces from following the movements of the brake drum surfaces, without regard to the direction of rotation of the drum.

Because it is desirable also to reduce the friction of radially outward and inward movements of the brake heads, the stops used are at the same time lateral bearings and are shown as roller bearings. I would point out also that the bearings, of whatever character, perform the function of delivering the braking efforts along the center lines of the brake drum arcs; i. e. perpendicular to the braking surfaces.

While recognizing that the guides which act as stops need not be rollers but can be any appropriate lateral bearings, I will describe the roller form illustrated:

The top and bottom walls 69 of the housings form guides for cooperating guide rollers 69' mounted upon the brake heads, whereby friction of radially outward and radially inward movements of the brake heads is reduced and the brake heads are supported laterally close to the drum surfaces against circumferential movement of the braking surfaces which are carried by the heads.

Hand braking is effected by a hand brake lever 70 which swings a bell crank shaft 71 having bell crank arm 72, so as to throw link 73 toward or away from the main shaft 9. The link is connected between pins 74 and 75 to operate a toggle comprising lever arms 76 and 77, so as to engage with levers 44 through pins 79 and 80. Toggle lost motion is provided by the play 81.

The inner ends of the brake head pins are secured to the intermediate portions of the brake levers 44 by pressed fits and are welded in. The outer ends of said pins form bearings for the support of the inner ends of the brake heads 15 and 16, Figures 1 and 2.

The inner ends of the brake heads are held in place by washers 82 and brake head pin-retaining rings 83.

The guide rollers carried by the outer parts of the heads are balanced, two in front of and two behind the webs of the heads.

It will be evident that the tapers of the brake adjuster plungers, by reason of which they are larger at the outer ends than at the inner ends, facilitate movements of the plungers outwardly when the brake linings are reduced by wear.

The tapers of the plungers greatly reduce any tendency which might otherwise be present for the pull of the retracting spring to move the plungers inwardly, with the result that the plungers progressively and automatically are shifted as needed and the lost motion distances between the walls of the brake head opening and the plungers are maintained the same, whatever the positions of adjustment of the plungers.

It will be evident that the long arm of the hand brake applied through the bell crank shaft and toggle arms may be effective for emergency brake effort without interference with the power brake operation as described. Since the setting of the toggle arms may be suited to the extent of lost motion between braking position and release of the power brake, the hand brake effort may be spread over the entire lost motion distance of brake head movement or may be concentrated on a small part of the movement, as preferred. The lost motion in the outer ends of the toggle arms will permit movement of the brake under power operation without disturbance of the lever of the emergency hand brake.

It will be evident that removal of the brake adjuster screws releases the pressure of the brake adjuster springs upon the gibs and facilitates movement of the brake heads inwardly by the retraction spring to a point in which the brake heads can be removed for the purpose of replacing the linings.

It will be evident that after each new shift in the position of an adjuster, normal operation is resumed with a range of lost motion movement which is the same as before but which starts and ends slightly farther from the center than before.

When fluid under pressure from a master cylinder (not shown) enters the wheel cylinder and pushes the pistons therein apart, the otherwise free ends of the operating levers are separated, carrying outwardly the two heads which are pivoted at intermediate points in the lengths of these levers. As a result of the outward movements of the heads, the flanges of the heads cause their brake linings to engage the inner surfaces of the drum. This applies the brake. When the pressure in the wheel cylinder is released, the arms are retracted by the retraction spring between them, with the result that the brakes are released.

The lost motion between the plungers which lie within the openings in the heads and the adjacent radially limiting ends of the openings in the heads, permits application of the brakes and release of the brakes without other change than application and release of pressure in the wheel cylinder, so long as the brake linings are not worn appreciably.

Just as soon as the brake linings wear enough to make any difference in brake application, the application of the brakes operates through the plungers to press the outer ends of the plungers against the inwardly facing outer ends of the openings in the heads, shifting the plungers radially outwardly, and automatically maintaining the predetermined clearance between the brake lining and the surface of the brake drum after the brake has been released.

After the fluid pressure in the wheel cylinder has been reduced, the release spring will move the brake mechanism in the direction of the wheel cylinder until the "bearings" of the brake heads (that is, the radially outwardly facing inner ends of the openings in the brake head webs) come in contact with bearings of the brake adjuster plungers (that is, the inwardly facing inner ends of the plungers). The brake adjuster plungers are protected against any movement beyond the lost motion in the direction of the wheel cylinder, even though the brake adjuster plungers are urged inwardly by the retraction spring. The pull of the release spring is not sufficient to overcome the resistance created by the tapered side faces, which are provided with the friction linings and whose side wall "taper" is heaviest at the outside.

When the brakes are applied and released they are guided along the "center line" toward the brake drum by stops located within the openings and by the cooperating rollers or other bearing parts.

Since the housings are fixed upon the backing plate and the bearings cooperating with them are located close up to the head flanges, the heads are quite firmly supported close to the brake linings and effectively stop the heads from following the rotation of the brake drum in either direction.

In view of my invention and disclosure variations and modifications to meet individual whim or particular need will doubtless become evident to others skilled in the art, to obtain all of part of the benefits of my invention without copying the structure shown, and I therefore, claim all such in so far as they fall within the reasonable spirit and scope of my claims.

Having thus described my invention, what I claim as new and desire to secure by Letters Patent is:

1. In a brake, a hub adapted to be connected with a rotating member, a casing rotatable with the hub and having brake drum friction surfaces, a fixed backing plate for the casing, a pair of spaced levers pivoted at corresponding ends to the backing plate, brake heads pivoted respectively to the brake levers, a brake cylinder and connections operating the levers to separate the lever ends, a tension spring tending to retract the levers, a hand brake lever, a bell crank, and a pair of toggle levers connected at one end each with the brake levers and at the other ends to the bell crank.

2. In a brake, a hub adapted to be connected with a rotating member, a casing rotatable with the hub and having brake drum friction surfaces, a fixed backing plate for the casing, a pair of spaced levers pivoted at corresponding ends to the backing plate, brake heads pivoted respectively to the brake levers at intermediate points in the lengths of the levers, a brake cylinder having pistons, connections between the respective pistons and the otherwise free ends of the levers to provide fluid pressure separation of these latter lever ends, a tension spring tending to retract the levers, a hand brake lever, a pair of toggle levers connected at one end with the brake levers and the opposite ends to the hand brake lever and automatic adjusting devices extending from the backing plate through openings in the heads, normally limiting inward movement of the heads and capable of being forced outwardly by movement of the heads.

3. A power brake including in its train of operation a pair of brake levers, brake heads carried by the levers and a drum against which the brakeheads operate, in combination with toggles connected to spread the same brake levers, a manually operated lever, and connections between the manually operated lever and the toggles to spread said brake levers.

4. In a brake mechanism, a rotatable casing, a brake drum carried by the casing, means for rotating the drum, a backing plate, two brake levers pivoted to the backing plate at one end each of the levers, a wheel cylinder, means for operating the brake levers from the cylinder, brake heads carried by the levers, connections between the brakeheads and drum to make the brake effective, a hand lever, a bell crank of which the hand lever forms one arm, a pair of toggles connected to spread said brake levers and connections between the second arm of the bell crank and the toggles.

5. A power brake including in its train of operation a pair of brake levers, brake heads carried by the levers and a drum against which the brakeheads operate, in combination with toggles connected to spread the same brake levers, a manually operated lever, and connections between the manually operated lever and toggles to spread the brake levers, there being lost motion between the toggles and the levers, whereby power operation does not disturb the manual operation.

6. A power brake of the type having an inwardly facing brake drum, outwardly facing heads adapted to engage the drum surface, brake levers carrying the brakeheads and pivoted at corresponding ends of the two levers and power means for spreading the ends of the levers farther from their pivot points, in combination with a manually operated lever, spreading arms connected with the manual lever and pivoted to both of said brake levers and to one another and connections between the manual lever and the spreading arms, whereby the same brake heads and the same drum are operated by the same brake levers whether the operation be by power or by hand.

7. A power brake of the type having an inwardly facing brake drum, outwardly facing heads adapted to engage the drum surface, brake levers carrying the brake heads and pivoted at corresponding ends of the levers and power means for spreading the ends of the levers further from their pivot points in combination with a manual lever, spreading arms connected with the lever and pivoted to both of said brake levers and connections between the manual lever and the spreading arms, the spreading arms being slotted at their ends where they connect with the brake levers so as to permit the power operation of the brake levers without interference with the manual operation of the lever, whereby the same brakeheads and the same drum are operated by the same brake levers whether the operation be by power or manually.

THOS. JAMES, Jr.

REFERENCES CITED

The following references are of record in the file of this patent:

UNITED STATES PATENTS

| Number | Name | Date |
| --- | --- | --- |
| 1,804,773 | Hubbell, Jr. | May 12, 1931 |
| 1,816,093 | Scott | July 28, 1931 |
| 1,898,108 | White | Feb. 21, 1933 |
| 1,911,452 | La Brie | May 30, 1933 |
| 2,009,983 | Williamson | July 30, 1935 |
| 2,015,713 | Delahaye | Oct. 1, 1935 |
| 2,051,088 | Kittle et al. | Aug. 18, 1936 |
| 2,140,385 | Hunt et al. | Dec. 13, 1938 |
| 2,160,055 | Brace | May 30, 1939 |
| 2,186,264 | Nachtwey | Jan. 9, 1940 |
| 2,193,385 | Anderson | Mar. 12, 1940 |
| 2,210,336 | Payne | Aug. 6, 1940 |
| 2,219,764 | Chaminade | Oct. 29, 1940 |
| 2,299,412 | Sheldrick et al. | Oct. 20, 1942 |
| 2,330,004 | Neville | Sept. 21, 1943 |

FOREIGN PATENTS

| Number | Country | Date |
| --- | --- | --- |
| 552,174 | Great Britain | Mar. 25, 1943 |